(12) United States Patent
Stewart

(10) Patent No.: US 6,651,465 B1
(45) Date of Patent: Nov. 25, 2003

(54) ANTI-SPLASH CLIP FOR WASHING MACHINE

(76) Inventor: Terry V. Stewart, 119 Lindsay Ct., Elyria, OH (US) 44035

( * ) Notice: Subject to any disclaimer, the term of this patent is extended or adjusted under 35 U.S.C. 154(b) by 242 days.

(21) Appl. No.: 09/854,761

(22) Filed: May 14, 2001

Related U.S. Application Data

(60) Provisional application No. 60/205,043, filed on May 18, 2000.

(51) Int. Cl.⁷ .................................................. D06F 39/08
(52) U.S. Cl. .......................................... 68/208; 68/235
(58) Field of Search ................... 68/208, 235; 137/215, 137/217

(56) References Cited

U.S. PATENT DOCUMENTS

| | | | |
|---|---|---|---|
| 1,098,141 A | | 5/1914 | Welch |
| 1,439,031 A | | 12/1922 | Sterrick |
| 1,803,529 A | | 5/1931 | Hyatt |
| 2,053,533 A | * | 9/1936 | Rizor |
| 2,243,673 A | * | 5/1941 | Henry |
| 2,611,568 A | | 9/1952 | Yoder |
| 2,671,626 A | | 3/1954 | Schmadeke |
| 3,220,680 A | | 11/1965 | Williams |
| 3,862,433 A | * | 1/1975 | Rousselet |
| 3,897,923 A | | 8/1975 | Paepke et al. |
| 3,960,733 A | * | 6/1976 | Van Dieren |
| 4,163,457 A | | 8/1979 | Rickel et al. |
| 4,318,519 A | | 3/1982 | Blevins |
| 5,199,455 A | * | 4/1993 | Dlouhy |

* cited by examiner

Primary Examiner—Frankie L. Stinson
(74) Attorney, Agent, or Firm—Fay, Sharpe, Fagan, Minnich & McKee, LLP

(57) ABSTRACT

An anti-splash hose retainer (36) includes a substantially cylindrical body portion (38) having a first open end (40) and a second open end (42). The cylindrical body and is defined by an inner surface (46) and an outer surface (48). The inside diameter of the body portion is greater than or equal to the outside diameter of an associated drain hose. In an alternate embodiment, the body portion includes a vertical slit (80) and has an inside diameter less than the outside diameter of the drain hose. A flexible and resilient hook member (50), adapted to secure the hose retainer to an upwardly extending sidewall (52) of a drain receptacle (12), extends from the outer surface of the body portion. The hook member, which is substantially "S" shaped, has a first end (54) operatively connected to the outer surface of the body portion and a second free end (56) spaced along the body portion from the first end. A spine member (66) is included on a portion of an outer surface of the hook member.

14 Claims, 3 Drawing Sheets

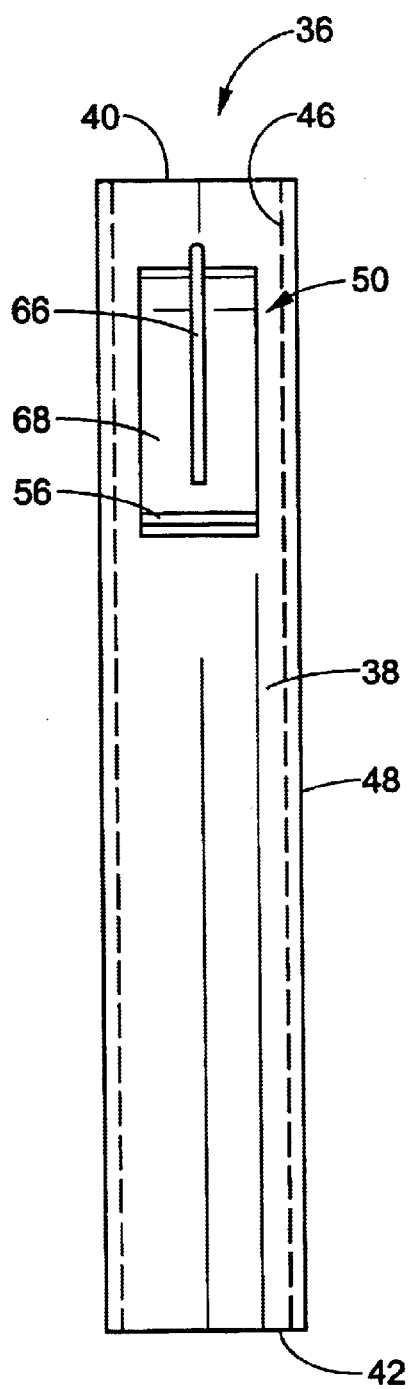
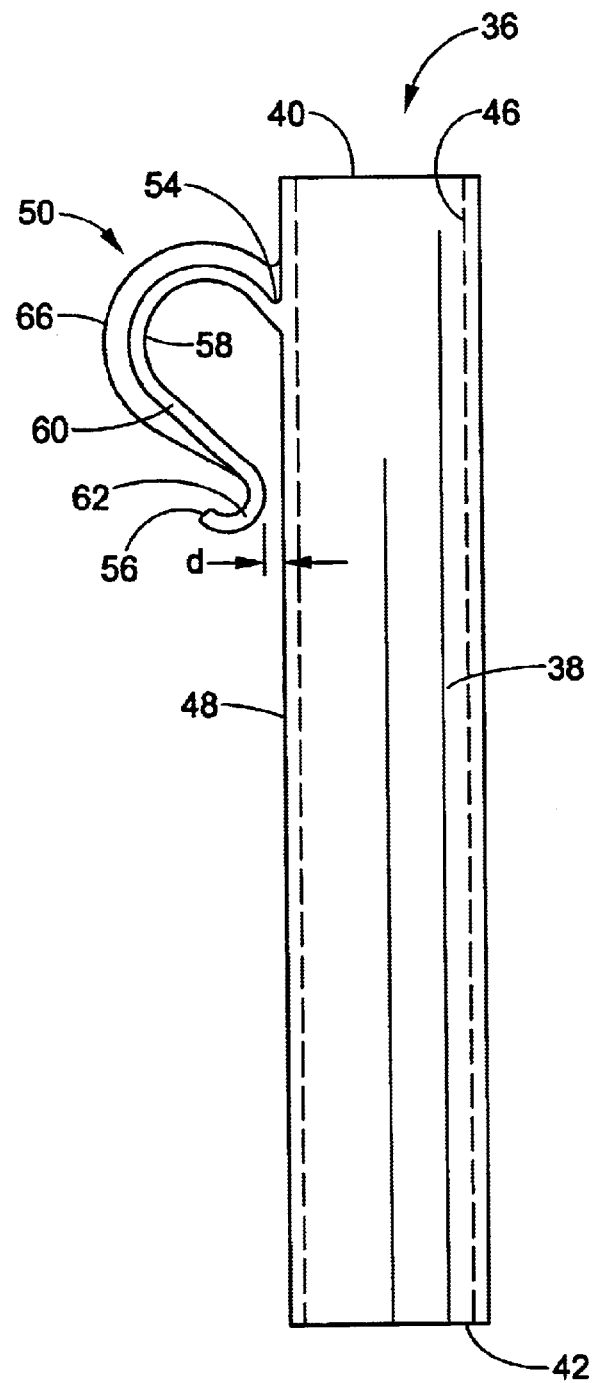
FIG. 3  FIG. 4

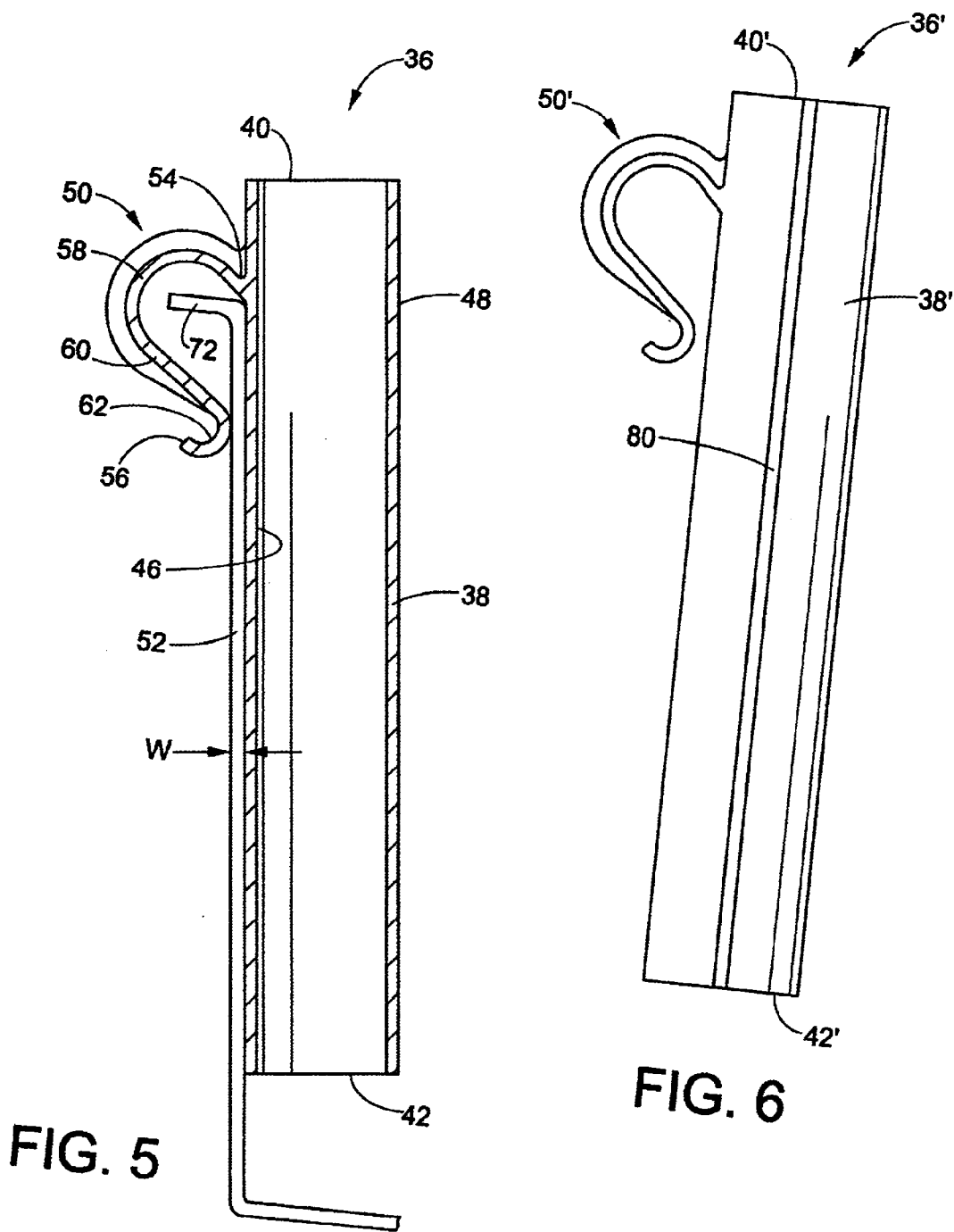

ANTI-SPLASH CLIP FOR WASHING MACHINE

CROSS REFERENCE TO RELATED PROVISIONAL APPLICATION

This application claims the benefit under 35 U.S.C. §119 (e) of U.S. Provisional Application No. 60/205,043, filed May 18, 2000.

BACKGROUND OF THE INVENTION

1. Field of the Invention

The present invention relates generally to a device for retaining the end of a hose, conduit, or the like in a desired position relative to an associated support, such as a drain, receptacle, or the like. The invention particularly relates to a new and improved attachment or retaining clip for a drain hose of a washing machine which directs spent laundry liquid into a laundry tub or standpipe in a smooth and anti-splash manner.

2. Discussion of the Prior Art

Most washing machines in use today automatically cycle through various operations until the articles to be cleaned are completely washed, rinsed, and partially dried. A typical washing machine includes a washing chamber or tub for receiving articles to be cleaned. Hot and/or cold water is introduced into the washing chamber from an outside source in a conventional manner. Washing solutions are added to the water. A motorized agitator churns the articles, thereby cleansing them from dirt, stains, etc. as is well known. Upon completion of the various washing, rinsing and spin cycles, the spent washing liquid is pumped from the chamber or tub through a drain conduit or hose into a stationary laundry tub or drain. The laundry tub or drain is, in turn, connected to the household sewage system.

In the past, hoses used for transporting spent laundry liquid from a washer to a laundry tub, drain or other type of receptacle have been fabricated from rubber or soft flexible synthetics which can be permanently formed into desirable configurations. However, this type of hose is susceptible to kinking, particularly if used in an environment requiring multiple and/or tight radius bends. More recently, light-weight corrugated flexible hoses fabricated from plastic materials have been made available for waste disposing connections. Such hoses have favorable anti-kink characteristics since they are relatively stiff and are capable of being bent to a desired drain configuration.

Drain hoses used for residential and commercial washing machine applications must be capable of carrying a relatively large volume of water. Such volume, even at relatively low pressure, tends to straighten out the hose so that it takes on a substantially elongated shape. Thus, if the drain hose is not securely fastened to the laundry tub or other structure, the drain hose can kick back causing the spent washing liquid to splash or spill over onto the floor.

This is obviously undesirable since significant repair costs may be incurred as a result of water damage.

Special fittings have been previously developed in order to prevent such splashing and spill over. For example, several early devices, which include U.S. Pat. Nos. 1,098, 141, 1,439,031, 1,803,529, 2,611,568, 2,671,626 and 3,220, 680, employ wire assemblies for retaining a hose in a desired curve over a vertical support. In addition, U.S. Pat. Nos. 4,318,519 and 4,163,457 disclose more complex wire assemblies adapted to bend a hose and secure it to a support structure. Finally, U.S. Pat. No. 3,897,923 teaches use of a section of toroid through which an end of a flexible hose is passed.

The foregoing devices have not proven completely effective in preventing discarded water from splashing or spilling over. In addition, and while the above noted prior devices have helped to minimize such occurrences, they are complex and relatively expensive to manufacture. Thus, a need exists to provide a simple and inexpensive retainer or clip for a drain hose of the type typically associated with a washing machine which will direct spent laundry liquid into a laundry tub, drain, or standpipe in a smooth and anti-splash manner.

SUMMARY OF THE INVENTION

A new and improved device is advantageously provided for securing a drain hose to an adjacent structure which meets the foregoing needs.

In accordance with one exemplary embodiment of the invention, an anti-splash hose retainer includes a hollow body portion having first and second ends. The hollow body portion defines a hose receiving passage. A hook member is operatively connected to an outer surface of the hollow body portion adjacent the first end. The hook member is adapted to secure the hose retainer to an upwardly extending sidewall of a drain receptacle. In the preferred construction, the body portion is cylindrical. The internal cross-sectional dimensions of the body portion are greater than or equal to the outside diameter of an associated drain hose.

In accordance with a more limited aspect of the invention, the hook member is substantially S-shaped, having a first end operatively connected to the outer surface of the body portion and a second free end.

In accordance with another aspect of the invention, a system for washing articles includes a washing chamber enclosed by a front wall, a back wall, and opposed side walls. A waste water receptacle is disposed adjacent the washing chamber. A drain hose includes a first end operatively connected to the back wall and a second free end disposed within the waste water receptacle. An anti-splash hose retainer secures the second free end of the drain hose to the waste water receptacle such that waste water drains through the drain hose from the washing chamber into the waste water receptacle in an anti-splash manner.

In accordance with a more limited aspect of the invention, the anti-splash hose retainer includes a hollow body portion having a first end and a second end where the hollow body portion defines a hose receiving passage. A hook member is attached to an outer surface of the hollow body portion adjacent the first end, which secures the anti-splash hose retainer to a side wall of the waste water receptacle.

In accordance with another aspect of the invention, an anti-splash hose retainer includes a hollow body portion having first and second spaced apart ends, where the hollow body portion defines a hose receiving passage. The hose retainer includes a hook member on the outer surface of the body portion adjacent the first end. The hook member is adapted to secure the body portion to an upwardly extending side wall of a drain receptacle. The hook member includes a first terminal end operatively connected to the outer surface of the body portion and a second free terminal end spaced longitudinally along the body portion from the first terminal it end.

In accordance with a more limited aspect of the invention, the hook member has a generally S-shaped conformation.

One advantage of the invention is the provision of a retainer or clip that is operatively connected to a drain hose and is capable of directing spent laundry fluid into a laundry tub in a clean and anti-splash manner.

Another advantage of the invention resides in the provision of a retainer or clip, which is relatively simple and inexpensive to manufacture, for effectively directing spent laundry fluid into a laundry tub.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein:

FIG. 3 is an elevational view of the anti-splash hose clip;

FIG. 4 is another elevational view of an anti-splash hose clip rotated 90° from the view of FIG. 3;

FIG. 5 is a longitudinal cross sectional view of the anti-splash hose clip shown in FIG. 4; and, FIG. 6 is a view similar to FIG. 4 for showing an alternative embodiment of the anti-splash clip.

DETAILED DESCRIPTION OF THE PREFERRED EMBODIMENTS

Figure 1:
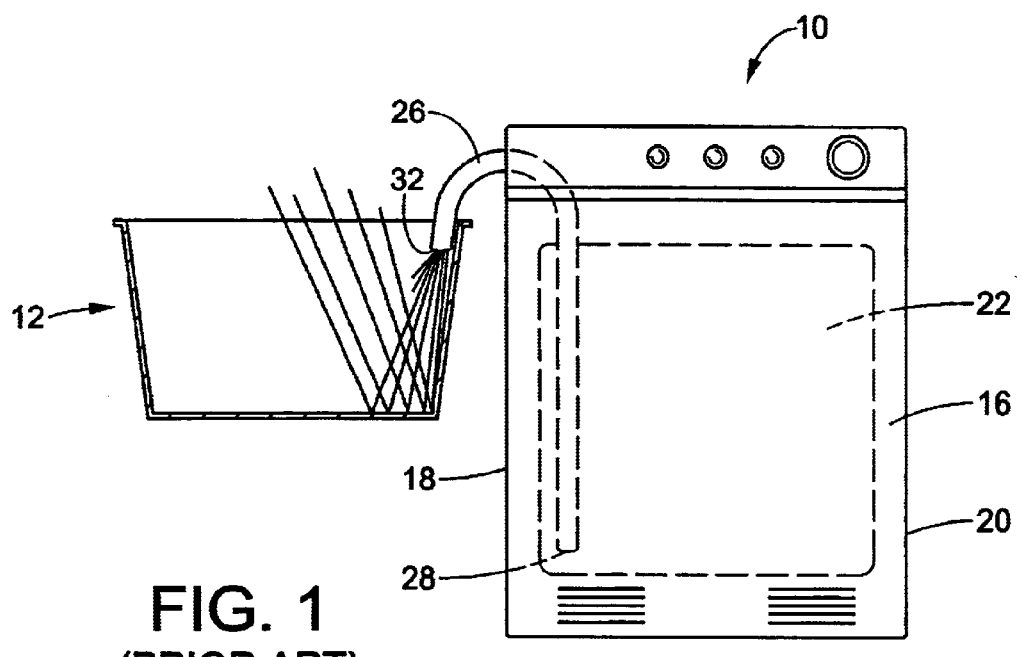
FIG. 1 is a schematic view of a drain hose disposed freely within a laundry tub in accordance with the prior art without an anti-splash hose clip.

Referring now to the drawings, which illustrate preferred embodiments of the invention only and are not intended to limit same, FIG. 1 shows a rear schematic view of a conventional washing machine 10 and a conventional laundry tub 12. Although the invention will be described with reference to the washing machine and laundry tub, it should be appreciated that it has equal applicability or utility with any suitable support structure, such as a standpipe or other fluid receptacle having an upwardly extending sidewall.

The washing machine includes a front wall (not shown), a back wall 16, and opposed sidewalls 18, 20. A washing chamber or basin 22 is surrounded by the walls of the washing machine and is adapted to contain articles to be cleaned. Hot and/or cold water, provided from a water valve control system (not shown), is mixed with cleaning solutions and added to the basin. A motorized agitator (not shown) churns the articles until they are cleansed of dirt, stains etc.

Upon completion of the washing, rinsing, and spin cycles, the spent washing fluid 14 is pumped from the washing chamber through a hollow drain hose or conduit 26 and into the laundry tub. The drain hose has a first end 28 operatively connected to the back wall 16 of the washing machine and a second free end 32 which is placed into the laundry tub. The hose is preferably fabricated from a corrugated plastic material, such as polypropylene, having axially spaced corrugations disposed uniformly along its length. In addition, the hose preferably has anti-kinking properties.

The washing liquid 14 from the washing and rinsing operations is subject to a specific pressure as it is pumped through the drain hose and into the laundry tub. Such pressure causes the drain hose to undergo unpredictable and erratic movement which results in splashing and spill over, as schematically shown in FIG. 1. In order to prevent splashing and spill over from occurring, an anti-splash hose retainer or clip 36 (see FIG. 2) is operatively connected to the free end 32 of the drain hose 26.

With reference now to FIGS. 3–5, a series of views of the anti-splash hose retainer 36 are shown in accordance with the present invention. The hose retainer is preferably fabricated from one piece of polyvinyl chloride (PVC), however, it will be appreciated that other materials are within the scope and intent of the present invention. In the illustrated embodiment, the hose clip includes a hollow body portion 38 defining a hose receiving passage and having first and second spaced apart open ends 40, 42. The body portion is preferably cylindrical in shape and is defined by inner and outer annular surfaces 46, 48, respectively. However, it is to be appreciated that the cross-section of the body portion may be of different geometries, such as square, triangular, hexagonal, octagonal, and the like. Preferably, the outside diameter of the body portion is approximately 1.875 inches while the inside diameter is approximately 1.625 inches. The inside diameter is greater than or equal to an outside diameter of the drain hose 26. Additionally, the body portion 38 preferably has a length of approximately 11.5 inches.

With continued reference to FIGS. 3–5, a retaining or mounting device 50, adapted to secure the hose retainer 36 to an upwardly extending sidewall 52 of the laundry tub 12 or any other suitable support structure, extends from the outer surface 48 of the body portion 38. The retaining device preferably comprises a hook member which resembles the shape of an "S". The hook member has a first end 54 operatively connected to the outer surface of the retainer body portion and a second free end 56.

Starting at its first end, the hook member 50 extends upwardly and away from the body portion of the hose retainer. It then curves approximately 180° in a direction back toward the body portion, thereby forming a first semicircular section 58. A substantially straight section 60 extends from the first semicircular section until reaching a second semicircular section 62. The second semicircular section curves approximately 180° in a direction upwardly and away from the body portion of the hose clip. A spine member or fin 66 is included on a portion of an outer surface 68 of the hook member to provide added strength and reinforcement.

Figure 2:
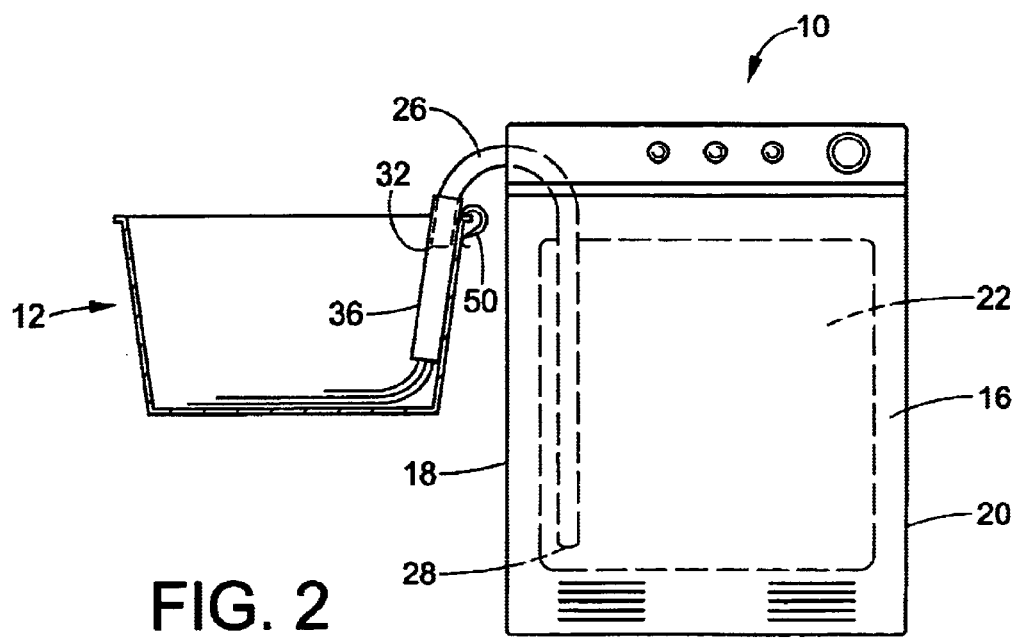
FIG. 2 is a schematic view of an anti-splash hose clip formed according to the present invention and attached to a drain hose extending between a washing machine and a laundry tub.

The hook member 50 has been described in accordance with a preferred embodiment. However, it must be understood that hooking and clamping means having different shapes and configurations are within the scope and intent of the present invention. For example, the hook member can be constructed having a reversed C-shape as shown in FIG. 2.

With reference to FIG. 5, many laundry tub sidewalls include a lip or rim 72, which protrudes outwardly from the sidewalls peripherally around at least a portion of the sidewall terminal outer edges. The first semicircular section 58 of the hook is significant because it provides more than adequate room to accommodate the outwardly protruding lip or rim. One skilled in the art will appreciate that by failing to provide adequate room to accommodate the lip, the outer surface 48 of the body portion 38 would not rest flush against the sidewall of the laundry tub 12. Such a configuration would be undesirable because it is less secure.

The hook member 50 is preferably constructed from a flexible material, such as a plastic material, and has a width of approximately 1.125 inches. A flexible material is desired so that the second semicircular section 62 of the hook member can be flexed outwardly in order to pass over the radially protruding lip 72 of the tub's sidewall 52. After passing over the lip, the second semicircular section springs back toward the sidewall and clamps the hook member securely in place.

In operation, the drain hose 26 is inserted into the body portion 38 of the hose retainer 36. As already noted, the outside diameter of the drain hose is less than or equal to the inside diameter of the body portion. Preferably, the drain hose fits relatively loosely within the hose retainer. Alternatively, the outside diameter of the drain hose and the inside diameter of the body portion are substantially equal so that the two components fit tightly together in a friction-fit relation.

Once the drain hose has been inserted into the hose retainer 36, it is secured to the sidewall 52 of the laundry tub 12 via the hook member 50. The second semicircular section 62 of the hook member is pulled outwardly so that it can pass over the lip 72 extending outwardly from the sidewall 52. The second semicircular section operates much like a tab providing a convenient means for pulling section 62 outward and over lip 72. After passing over the lip, the second semicircular section springs back inwardly into abutting relation with the sidewall of the laundry tub. The distance d (FIG. 4) between the second semicircular section of the hook member and the cylindrical body of the hose retainer is preferably less than the width w (FIG. 5) of sidewall 52. Thus, when semicircular section 62 springs back toward sidewall 52, it is pressed firmly thereagainst and securely attaches the hose clip to sidewall 52. In such a configuration, spent laundry liquid travels through the drain hose and into the laundry tub in an anti-splash manner (see FIG. 2).

Turning now to FIG. 6, an alternate embodiment is illustrated in accordance with the present invention. In this embodiment, like elements have like reference numerals with the addition of a primed (') suffix, while different elements are labeled with new reference numerals. As shown, the body portion 38 of the hose retainer 36' includes a vertical slit 80 extending longitudinally along the entire length of the body portion. The cylindrical body is fabricated from a flexible material having an inside diameter less than the outside diameter of the drain hose. In order to accommodate the drain hose, the body portion is flexed outwardly thereby increasing its inside diameter as well as the width of the slit. After the drain hose has been inserted into the body portion, the body portion flexes inwardly toward its natural position, thereby gripping the drain hose and preventing it from slipping from the hose retainer.

The invention has been described with reference to preferred and alternative embodiments. Obviously, modifications and alterations will occur to others upon a reading and understanding of this specification. Merely by way of example, the inner surface 46 of the hose retainer body portion 38 could include threads so that the drain hose can be threadably fastened to the hose retainer. The invention is intended to include all such modifications and alterations insofar as they come within the scope of the claims and the equivalents thereof.

Having thus described the preferred embodiments, the invention is now claimed to be:

1. An anti-splash hose retainer comprising:
a hollow substantially cylindrical and discontinuous body portion having a first and second spaced apart ends, said discontinuity defining a longitudinal slit along the length of the body portion between the first and second ends, with said hollow body portion defining a hose receiving passage; and,
a retaining member on the outer surface of the body portion adjacent the first end, said retaining member being adapted to secure the body portion to an upwardly extending sidewall of a drain receptacle.

2. An anti-splash hose retainer comprising:
a hollow body portion having first and second spaced apart ends, said hollow body portion defining a hose receiving passage; and,
a hook member on the outer surface of the body portion adjacent the first end adapted to secure the body portion to an upwardly extending side wall of a drain receptacle, said hook member having a first terminal end operatively connected to the outer surface of the body portion and a second free terminal end spaced longitudinally along the body portion from the first terminal end.

3. The anti-splash hose retainer according to claim 2, wherein the hollow body portion is substantially cylindrical.

4. The anti-splash hose retainer according to claim 3, wherein the hollow body portion includes an inner surface having a diameter substantially equal to the outside diameter of a drain hose adapted to be operatively connected thereto.

5. The anti-splash hose retainer according to claim 4, wherein the inner surface of the hollow body portion includes threads adapted to threadably receive an associated drain hose.

6. The anti-splash hose retainer according to claim 2, wherein the body portion has a substantially annular cross-section.

7. The anti-splash hose retainer according to claim 2, wherein the body portion has a cross-section that is substantially one of (i) square, (ii) triangular, (iii) hexagonal, and (iv) octagonal in shape.

8. The anti-splash hose retainer according to claim 2, wherein at least the body portion is made from polyvinyl chloride.

9. The anti-splash hose retainer according to claim 2, wherein the hook member has a generally S-shaped conformation.

10. The anti-splash hose retainer according to claim 2, wherein the hook member has a generally C-shaped conformation.

11. A system for washing articles comprising:
a washing chamber enclosed by a front wall, a back wall, and opposing side walls;
a waste water receptacle disposed adjacent the washing machine drain hose having a first end operatively connected to the back wall and a second free end disposed within the waste water receptacle; and
an anti-splash hose retainer which secures the second free end of the drain hose to the waste water receptacle such that waste water drains through the drain hose from the washing chamber into the waste water receptacle in an anti-splash manner.

12. The system according to claim 11, wherein the anti-splash hose retainer includes:
a hollow body portion which defines a hose receiving passage; and
a retaining member attached to an outer surface of the body portion which secures the anti-splash hose retainer to a sidewall of the waste water receptacle.

13. The system according to claim 12, wherein the retaining member comprises a hook member having a generally S-shaped conformation, with a first end operatively connected to the body portion and a second free end.

14. The system according to claim 12, wherein the body portion is substantially cylindrical and discontinuous, said discontinuity defining a longitudinal slit along the length of the body portion.

* * * * *